United States Patent
Chang et al.

[11] Patent Number: 5,889,634
[45] Date of Patent: Mar. 30, 1999

[54] REDUCED-ALTITUDE-SENSITIVE SUBAMBIENT PRESSURE AIR BEARING SLIDER

[75] Inventors: Ciuter Chang, Fremont; Yiao-Tee Hsia, Pleasanton, both of Calif.

[73] Assignee: Read-Rite Corporation, Milpitas, Calif.

[21] Appl. No.: 735,043

[22] Filed: Oct. 22, 1996

Related U.S. Application Data

[63] Continuation-in-part of Ser. No. 574,303, Dec. 18, 1995, abandoned.

[51] Int. Cl.$^6$ ..................................................... G11B 5/60
[52] U.S. Cl. ............................................................ 360/103
[58] Field of Search .................................. 360/103, 104, 360/125, 126, 122, 97.01, 98.01

[56] References Cited

U.S. PATENT DOCUMENTS

| | | | |
|---|---|---|---|
| 5,287,235 | 2/1994 | Cunningham et al. | 360/103 |
| 5,309,303 | 5/1994 | Hsia et al. | 360/103 |
| 5,343,343 | 8/1994 | Chapin | 360/103 |
| 5,353,180 | 10/1994 | Murray | 360/103 |
| 5,396,387 | 3/1995 | Murray | 360/103 |
| 5,406,432 | 4/1995 | Murray | 360/103 |
| 5,473,485 | 12/1995 | Leung et al. | 360/103 |
| 5,513,056 | 4/1996 | Kawasaki et al. | 360/103 |
| 5,515,219 | 5/1996 | Ihrke et al. | 360/103 |

FOREIGN PATENT DOCUMENTS

| | | | |
|---|---|---|---|
| 1-298585 | 12/1989 | Japan | 360/103 |

*Primary Examiner*—Jefferson Evans
*Attorney, Agent, or Firm*—Nathan N. Kallman

[57] ABSTRACT

The air bearing surface of an air bearing slider is formed with first and second leading end tapers that are spaced from the sides of the slider. Air bearing pads are formed with transverse sections and longitudinal legs which define a major recessed central region. The leading end tapers and the transverse sections delineate a narrow recessed channel extending from the slider leading end to the recessed central region. Angled recessed areas are formed between the legs and sides of the slider. A third pad is located at the trailing end of the slider. As a result, the slider has virtually no roll and improved stiffness for pitch and vertical characteristics of the slider over a large range of altitudes, including sea level to about 10,000 feet above sea level.

9 Claims, 3 Drawing Sheets

REDUCED-ALTITUDE-SENSITIVE SUBAMBIENT PRESSURE AIR BEARING SLIDER

This application is a continuation-in-part application Ser. No. 08/574,303, filed Dec. 18, 1995, now abandoned.

FIELD OF THE INVENTION

This invention relates to magnetic heads and in particular to an air bearing slider for use in disk drives that require near constant flying height characteristics at different altitudes.

DESCRIPTION OF THE PRIOR ART

Magnetic head assemblies that fly relative to rotating magnetic disks are used extensively in disk drives for recording and reading data. One objective when using flying heads on which at least one magnetic transducer is deposited in a transducing relationship with a magnetic recording disk is to obtain a very close spacing between the transducer and the disk surface. By maintaining a close spacing, it is possible to record short wavelength or high frequency signals thereby realizing high density and high storage capacity data recording. A problem with flying the slider close to the disk surface is that when there is any variation of slider flying height, the possibility of increasing interference between the slider and the disk may result in reliability problems and head crashes. It is highly desirable to fly the head slider at a substantially constant flying height close to the disk surface, and to minimize flying height variations when operating the disk drive in different ambient environments, since variations in head-to-disk spacing adversely affect disk interface reliability.

Air bearing sliders used in disk drives typically have a leading end and a trailing end at which thin film transducers are deposited. Generally, the sliders have tapered portions, called tapers, at the leading end and longitudinal rails that extend from the tapers substantially to the trailing end. The tapers may be shaped and of such length as to provide fast pressure buildup during takeoff of the slider from a rest position to a flying attitude relative to the disk surface. The dimensions and shapes of the tapers and rails are instrumental in determining the flying characteristics of the head. The rail design determines the pressure generated at the air bearing surface of the slider. In effect, the pressure profile across the air bearing surface (ABS) of the slider contributes to the flying characteristics, including flying height and pitch and roll of the head relative to a rotating magnetic disk.

When using disk drives that incorporate rotating magnetic disks and magnetic heads with air bearing sliders at different altitudes, such as from sea level to 10,000 feet above sea level for example, the less dense air and lower air pressure affect the slider aerodynamic characteristics which contribute to the flying action of the air bearing slider. Undue changes in flying height, pitch and roll adversely affect head/disk interface interaction and degrade disk drive reliability.

SUMMARY OF THE INVENTION

An object of this invention is to provide an air bearing slider that is less sensitive to variations in altitude.

Another object of this invention is to provide an air bearing slider which is characterized by a very low flying height that is substantially maintained at different altitudes.

According to this invention, the air bearing surface (ABS) of an air bearing slider that is used with a magnetic head arm assembly is configured with leading edge tapers that are spaced from the sides of the slider; first and second pads configured as a numeral "7" and as a reverse "7" respectively; and a third small pad that is located at the trailing end of the slider. Each of the first and second pads has a relatively short transverse section that is joined to a longitudinal leg which diverges and extends angularly from the transverse section. The tapers and the transverse sections define a narrow recessed channel which extends to a major central recess between the longitudinal legs. The central recess continues from the legs to the trailing edge of the slider, and extends across the width of the slider in the region following the trailing ends of the pads. A third pad is provided at the trailing end of the slider, within the recess region, and substantially centered with reference to the slider sides. A thin film magnetic transducer (not shown) is deposited on the wall of the trailing end of the slider so that the transducing gap is adjacent to the ABS of the slider.

DESCRIPTION OF THE DRAWINGS

The invention will be described in greater detail with reference to the drawing in which.

Figure 1:
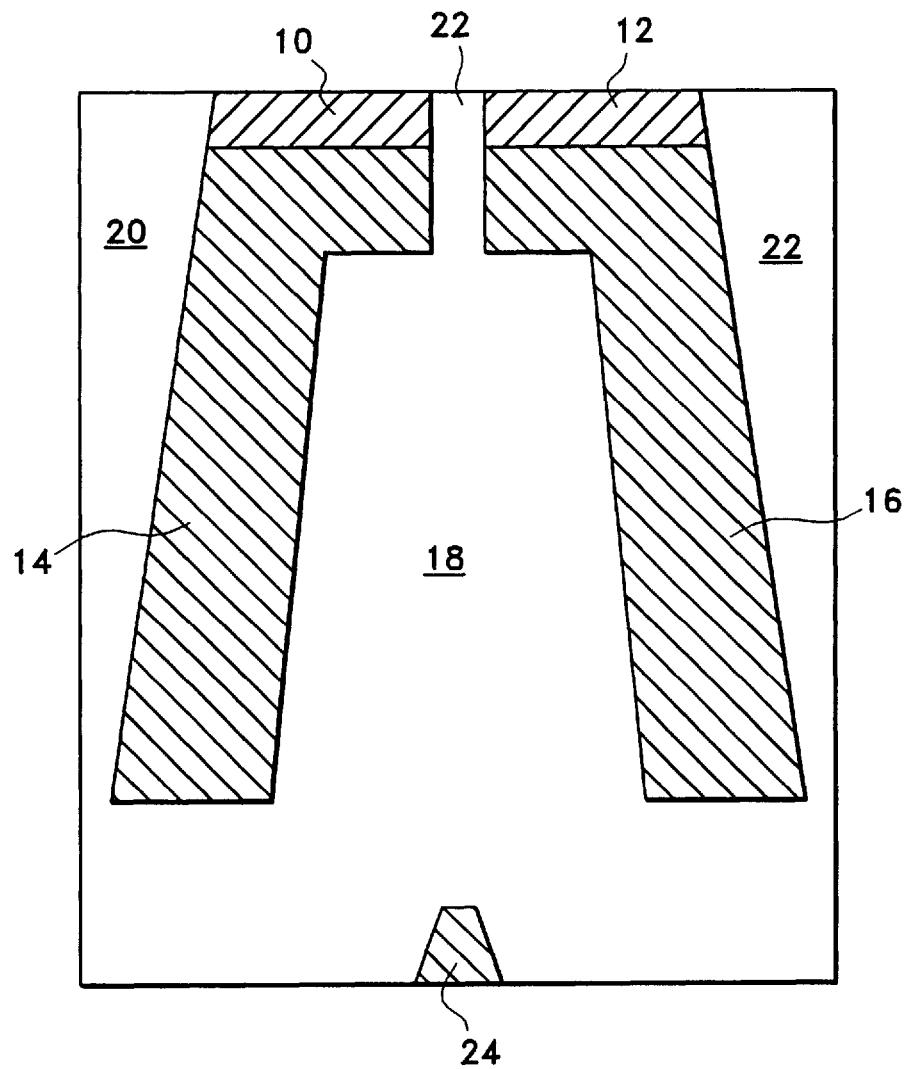
FIG. 1 is a plan view of the configured ABS of a slider, according to the invention.

It should be understood that representations of dimensions and the proportions of the various parts in the drawings are not necessarily accurate and may be exaggerated and depicted for visual clarity.

DETAILED DESCRIPTION OF THE PREFERRED EMBODIMENT

With reference to FIG. 1, an air bearing slider is characterized by a leading end and a trailing end that define the longitudinal dimension of the slider between the parallel sides of the slider. As illustrated, tapers 10 and 12 are formed at the leading end and are spaced from the sides of the slider. Rails or pads 14 and 16 are shaped as a reversed "7" and a "7" respectively. The pads 14 and 16 include transverse sections disposed adjacent to the tapers 10 and 12, and longitudinal legs that extend from the transverse sections at a diverging angle towards the sides of the slider. The legs extend only partially towards the trailing end of the slider, but beyond the midpoint as measured along the slider longitudinal axis from the leading end to the trailing end. The legs of the pads 14 and 16 are spaced from the sides of the slider as well as being spaced from the trailing end of the slider.

A third pad 24 is provided at the trailing end of the slider, preferably centered between the slider sides. As known in the art, a magnetic transducer (not shown) is deposited on the end wall of the slider so that the transducing gap is located at the ABS adjacent to the third pad. Preferably, the third pad 24 is wedge-shaped and extends a relatively short distance from the slider trailing end so that the leading edge of the third pad is closer to the slider trailing end than the trailing edges of the legs of pads 14 and 16. Alternatively the pad 24 may be shaped as a triangle or have a half-moon shape.

The tapers 10 and 12 and the transverse sections of pads 14 and 16 define a recessed channel 22 therebetween. The channel 22 is illustrated as being rectangular, but may be formed with angled sides. Following the channel 22, a major recess 18 is provided centrally between the legs of the pads 14 and 16, and continues to the trailing end of the slider, and around the third pad 24. Angular recessed regions 20 and 22 are formed between the slider sides, and the tapers 10 and 12 and legs of pads 14 and 16. The recessed regions 20 and 22 preferably have the same depth relative to the pads 14 and 16 and the same depth as the recessed channel 22 and the major central recess 18.

The major recess 18 controls the negative pressure force and serves to enhance stiffness of the pitch, roll and vertical characteristics of the air bearing slider. The angular side recesses 20 and 22 provide a transverse pressure to balance slider roll and to control and adjust pitch at non-zero skew angle operating condition.

Figure 2:
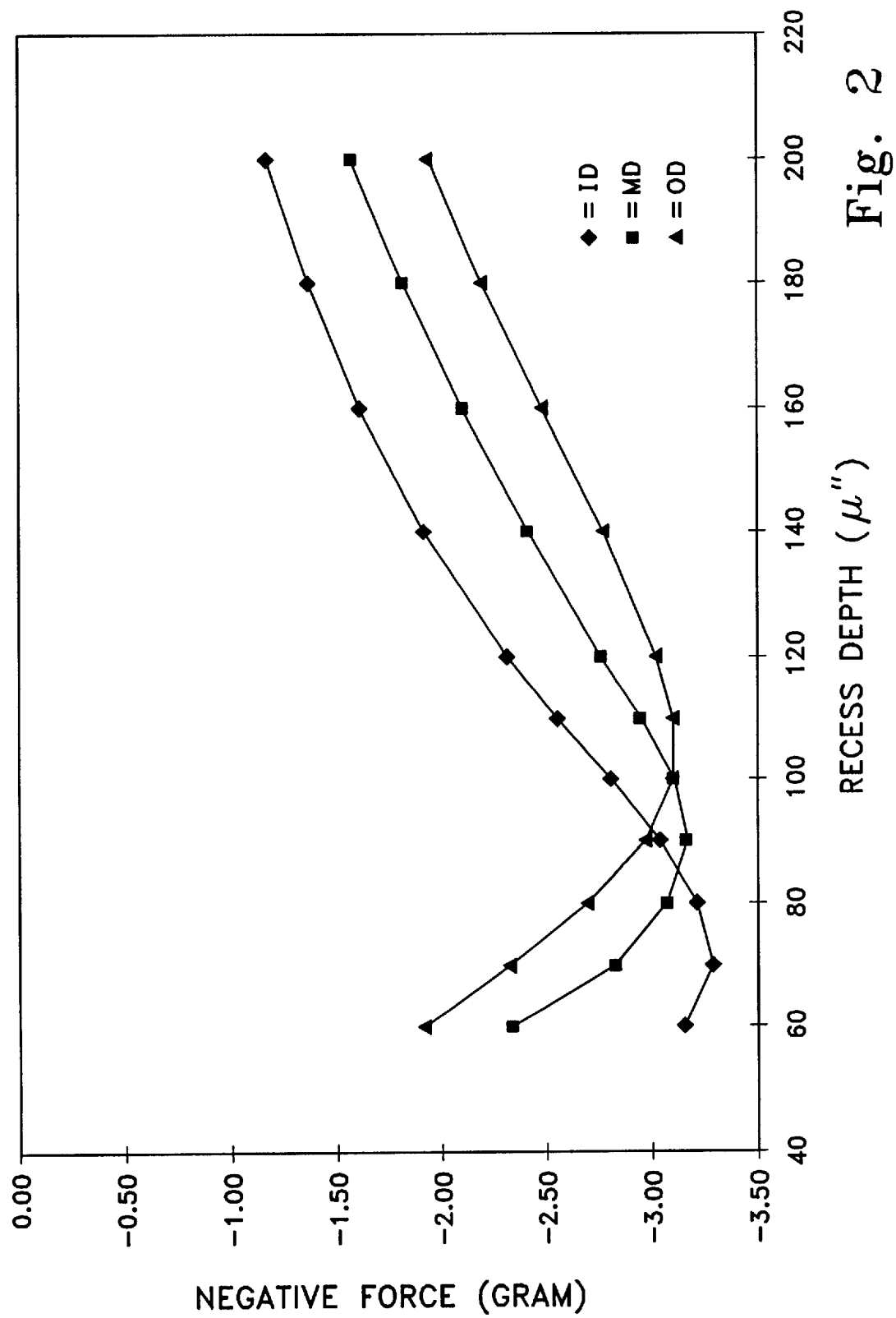
FIG. 2 shows curves plotting negative force in grams experienced by the slider of this invention during operation, against the depth of the recesses formed in the air bearing surface of the slider, measured in microinches.

FIG. 2 presents plots of negative force in grams experienced during operation of an air bearing slider, made in accordance with this invention, having a given recess depth measured in microinches. The plots represent measurements made at the inner diameter (ID), mid-diameter (MD) and the outer diameter (OD) of a rotating disk used with a configured air bearing slider in accordance with this invention. In an implementation of the invention, nanosliders that were tested were formed with the lengths of the pads 14 and 16 of about 0.065 inch, the widths of the longitudinal legs at the leading ends of about 0.010 inch, the transverse dimension of each of the transverse sections of pads 14 and 16 of about 0.016 inch, and the width of each transverse section measured along the length of the slider of about 0.008 inch. The angles defined by legs 14 and 16 relative to the leading end of the slider range from 2°–15°. The length of the channel 22 was about 0.020 inch and the width of the channel 22 was about 0.006 inch. The length of the third pad 24 was about 0.0077 inch and the width at the leading end of the third pad was about 0.010 inch, whereas the larger width of the third pad at the trailing end was about 0.015 inch. The lengths of tapers 10 and 12 from the leading end were about 0.008 inch, the taper widths at the leading end were about 0.020 inch while the widths at the trailing end of the tapers depend on the rail angle. The tapers 10 and 12 were formed at an angle of about 35 minutes. The etched depth of the recesses were selected to be about 100 microinches. As previously stated, the dimensions of the pads, tapers and recesses are not shown in exact proportion or in proper dimension, but may be exaggerated for visual clarity.

With this implementation, the gram load applied to the slider was 3.5 grams. The nanoslider experienced minimal roll and optimum pitch at a flying height of 1 microinch operating with a disk rotation of 4500 rpm (revolutions per minute).

Figure 3:
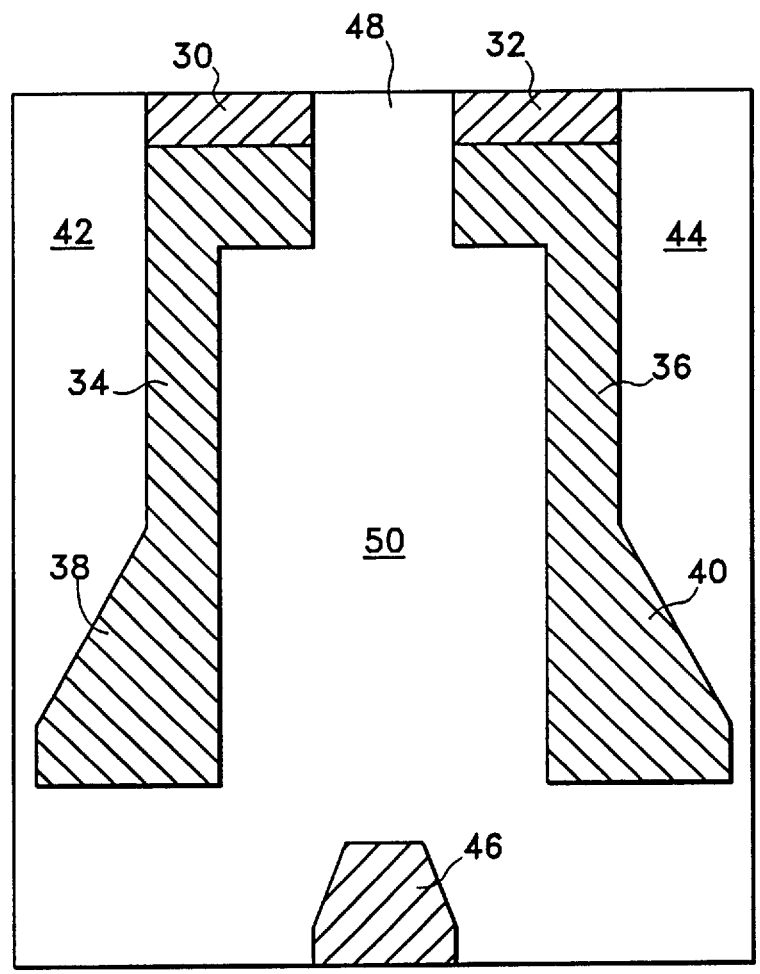
FIG. 3 is a plan view of an alternative embodiment of a configured ABS of a slider, made in accordance with this invention.

FIG. 3 depicts an alternative ABS slider configuration having leading edge tapers 30 and 32 followed respectively by pads having transverse sections and rectangular longitudinal legs 34 and 36. Sections 38 and 40 diverge from legs 34 and 36 and extend a distance so that the spacing between the trailing end of the sections 38 and 40 is greater than the length of the third pad from the trailing edge. Recessed regions 42 and 44 are provided respectively between the sides of the slider, and tapers 30 and 32 and legs 34 and 36. A recessed channel 48 formed at the leading end of the slider is defined between the tapers and the transverse sections of the pads. A major central recess 50 is provided between the legs and diverging sections of the pads and continues to the trailing end of the slider where it surrounds the third pad 46. This configuration realizes controlled pitch stiffness, roll stiffness and vertical stiffness at different altitudes.

The ABS configuration of this invention is particularly applicable to nanosliders, which has dimensions that are 50% of a full size standard slider. The standard slider is 0.160 inch in length, 0.125 inch in width and 0.0345 inch in height, whereas a nanoslider is 0.080 inch in length, 0.063 inch in width and 0.017 inch in height. The invention may also be applicable for picosliders that are 30% of the standard full size slider and femtosliders that are 10–15% of the standard full size slider.

By virtue of this invention, air bearing sliders can operate successfully at different altitudes, with very low flying height, controlled pitch stiffness, roll stiffness and vertical stiffness.

What is claimed is:

1. An air bearing surface of an air bearing slider for use with a magnetic head assembly, having a leading end and a trailing end, and first and second sides, defining a central longitudinal axis and a transverse axis between said sides along a midpoint of said longitudinal axis comprising:

first and second tapers formed at said leading end, said tapers being spaced from said sides;

first and second pads formed adjacent to said first and second tapers respectively, each pad having a transverse section adjacent to said tapers, and a longitudinal leg extending from a respective transverse section and diverging at an angle towards a respective one of said sides and away from said longitudinal axis;

a third pad formed at said trailing end such that a distance between a leading edge of said third pad and said trailing end is smaller than the distances between trailing edges of the longitudinal legs and said trailing end;

a recessed channel between said tapers and transverse sections of said pads;

a major central recessed region between said longitudinal legs extending to the trailing end of said slider; and recessed areas between said longitudinal legs and said sides;

wherein said recessed channel, said major central recessed region, and said recessed areas form a continuous recessed region; and whereby said slider operates at substantially the same very low flying height with controlled roll and pitch.

2. An air bearing surface as in claim 1, wherein said third pad is wedge-shaped, triangular shaped or half-moon shaped.

3. An air bearing surface as in claim 1, wherein said third pad is located substantially at the center between said sides of said slider.

4. An air bearing surface as in claim 1, wherein said longitudinal legs diverge from said transverse sections at an angle.

5. An air bearing surface as in claim 4, wherein said angle is in the range of two degrees to fifteen degrees.

6. An air bearing surface as in claim 1, wherein said recessed channel, said major central recessed region and said recessed areas between said longitudinal legs and said sides are etched to the same depth.

7. An air bearing surface as in claim 1, wherein said recesed channel is rectangular.

8. An air bearing surface as in claim 1, wherein said recesed channel is formed with angular sides.

9. An air bearing surface as in claim 1, wherein each longitudinal leg is configured with a rectangular section adjacent to said transverse section and a section that diverges from said rectangular section towards said sides of said slider.

* * * * *